(12) United States Patent
Qiu et al.

(10) Patent No.: US 9,626,047 B2
(45) Date of Patent: *Apr. 18, 2017

(54) CAPACITIVE TOUCH UNIT AND CAPACITIVE TOUCH SCREEN

(71) Applicant: Shenzhen China Star Optoelectronics Technology Co., Ltd., Shenzhen, Guangdong (CN)

(72) Inventors: Jie Qiu, Shenzhen (CN); Yung-lun Lin, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 610 days.

This patent is subject to a terminal disclaimer.

(21) Appl. No.: 14/111,173

(22) PCT Filed: Aug. 14, 2013

(86) PCT No.: PCT/CN2013/081477
§ 371 (c)(1),
(2) Date: Oct. 10, 2013

(87) PCT Pub. No.: WO2015/021619
PCT Pub. Date: Feb. 19, 2015

(65) Prior Publication Data
US 2016/0154496 A1 Jun. 2, 2016

(30) Foreign Application Priority Data
Aug. 13, 2013 (CN) .......................... 2013 1 0350486

(51) Int. Cl.
*G06F 3/041* (2006.01)
*G06F 3/044* (2006.01)
(Continued)

(52) U.S. Cl.
CPC ........... *G06F 3/044* (2013.01); *G02F 1/13338* (2013.01); *G02F 1/13439* (2013.01); *G06F 3/0416* (2013.01)

(58) Field of Classification Search
CPC ...... G06F 3/044; G06F 3/0416; G06F 3/0412; G06F 2203/04103
See application file for complete search history.

(56) References Cited

U.S. PATENT DOCUMENTS 8,982,083 B2 * 3/2015 Kim ....................... G06F 3/044
345/173
9,013,643 B2 * 4/2015 Zhou .................. G02F 1/13338
349/12
(Continued)

FOREIGN PATENT DOCUMENTS

CN 202929595 U 5/2013

*Primary Examiner* — Olga Merkoulova
(74) *Attorney, Agent, or Firm* — Andrew C. Cheng

(57) ABSTRACT

The invention discloses a capacitive touch unit, including a sensing electrode, connected to a control unit through a sensing electrode lead; and a plurality of scan electrodes, disposed at two sides of the sensing electrode; the scan electrode being connected to the control unit through a scan electrode lead, and the scan electrodes and the sensing electrode being coplanar; wherein the sensing electrode comprising a plurality of identical sensing electrode units, the plurality of sensing electrode units being arranged regularly along a same direction, the plurality of sensing electrode units being electrically connected; each scan electrode comprising a plurality of identical scan electrode units, the plurality of scan electrode units being arranged regularly along a same direction and the direction the same as sensing electrode units, and the plurality of scan electrode units being electrically connected. The invention also provides a capacitive touch screen with the capacitive touch unit.

19 Claims, 4 Drawing Sheets

(51) Int. Cl.
*G02F 1/1333* (2006.01)
*G02F 1/1343* (2006.01)

(56) References Cited

U.S. PATENT DOCUMENTS

| | | | | |
|---|---|---|---|---|
| 9,285,624 B2* | 3/2016 | Qiu | .................. | G06F 3/0412 |
| 2015/0185900 A1* | 7/2015 | Ye | .................... | G06F 3/044 |
| | | | | 349/12 |

* cited by examiner

CAPACITIVE TOUCH UNIT AND CAPACITIVE TOUCH SCREEN

BACKGROUND OF THE INVENTION

1. Field of the Invention

The present invention relates to the field of touch techniques, and in particular to a capacitive touch unit and a capacitive touch screen with capacitive touch unit.

2. The Related Arts

The touch display screen as an input medium is one of the simplest and most convenient modes for human-machine dialogue. Hence, the touch display screen is widely applied to various electronic products. Based on the operating theory and information transmission medium, the touch screen products care categorized into four types: infrared touch screen, capacitive touch screen, resistive touch screen and surface acoustic wave touch screen, wherein the capacitive touch screen becomes the main stream technology for touch screen due to the advantages of long life-span, high transmittance and supporting multi-touch.

The capacitive touch screens include the surface capacitive type and the projected capacitive type. The projected capacitive type can be divided into self-capacitance type and mutual capacitance type. The self-capacitance type is by using Indium tin oxide (ITO, a transparent conductive material) to form sensing electrode and scan electrode array on glass surface. The sensing electrodes and the scanning electrodes respectively form a capacitance with ground, which is the so-called self-capacitance, that is, the electrode capacitance to ground. When the fingers touch capacitive screen, the finger capacitance will be added to the screen capacitance, so that the screen capacitance increases. In detecting the touch, the self-capacitance screen sequentially detects the sensing electrode and the scan electrode array. Based on the capacitance change before and after the touch, the coordinates of the sensing electrode and the scan electrode are determined respectively and then combined to become the coordinates of touch point. The scanning manner of the self-capacitance is equivalent to projecting the touch point on the touch screen to the X-axis and Y-axis directions, respectively. Then, the coordinates in the X-axis and Y-axis direction are calculated and combined into the coordinates of the touch point. FIG. 1 shows the theory behind the mutual capacitive touch screen. The manufacturing of mutual capacitance screen is also to form the sensing electrode Rx and scan electrodes Tx. The mutual capacitive screen differs from the self-capacitive screen in that a coupling capacitance $C_M$ is formed where the two groups of electrodes intersect. In other words, the two groups of electrodes become the two poles of the coupling capacitance $C_M$. When a finger touches the capacitive screen, the touch affects the coupling between the two electrodes near the touch point, thus changes the value of the coupling capacitance $C_M$ between the two electrodes. When detecting the value of mutual capacitance, the sensing electrodes emit excitation signal, and all the scan electrodes receive the signals. As such, the values of capacitances at all the junctions of the sensing electrode and the scan electrodes can be obtained, which is the two-dimensional capacitance of the entire touch screen. According to the information of the change in the two-dimensional capacitance of the touch screen, the coordinates of each touch point can be calculated. As such, multiple touch points on the screen can also be calculated.

In the known mutual capacitive touch screen, one approach is to manufacture the sensing electrodes Rx and scan electrodes Tx with two layers ITO conductive material respectively, and disposed on two non-coplanar parallel planes. The touch screen manufactured by this approach is called the double layer ITO (DITO) mutual capacitive touch screen. This approach requires complex manufacturing process and the yield rate is restricted by the manufacturing process. Another approach is to dispose the sensing electrodes Rx and scan electrodes Tx on the same plane, which is called the single layer ITO (SITO) mutual capacitive touch screen. In known SITO techniques, the sensing electrodes Rx and scanning electrode array Tx are generally disposed in a mutually perpendicular manner, and the two types of electrodes have different shapes so that a visual difference exists between the sensing electrodes Rx and scanning electrode array Tx. As the user can see the outline of the electrodes, this approach does not meet the requirements of the touch screen.

SUMMARY OF THE INVENTION

To overcome the shortcomings of the known technique, the present invention provides a capacitive touch screen able to reduce the visual difference perceptible to the human eye.

To achieve the above object, the present invention provides a capacitive touch unit, which comprises: a sensing electrode, connected to a control unit through a sensing electrode lead; and a plurality of scan electrodes, disposed at two sides of the sensing electrode; the scan electrode being connected to the control unit through a scan electrode lead, and the scan electrodes and the sensing electrode being coplanar; wherein the sensing electrode comprising a plurality of identical sensing electrode units, the plurality of sensing electrode units being arranged regularly along a same direction, the plurality of sensing electrode units being electrically connected; each scan electrode comprising a plurality of identical scan electrode units, the plurality of scan electrode units being arranged regularly along a same direction and the direction being the same as the sensing electrode units, and the plurality of scan electrode units being electrically connected.

According to a preferred embodiment of the present invention, a gap between two neighboring sensing electrode units is less than 129 um, a gap between two neighboring scan electrode units is less than 129 um, and a gap between the neighboring sensing electrode unit and the scan electrode unit is less than 129 um.

According to a preferred embodiment of the present invention, both the sensing electrode unit and the scan electrode unit are of long strip structure having a shape of straight line, wave or grid.

According to a preferred embodiment of the present invention, a first end of the scan electrode is embedded in the sensing electrode, and a gap exists between the scan electrode and the sensing electrode.

According to a preferred embodiment of the present invention, the tip of the first end of the scan electrode extends laterally along both sides.

According to a preferred embodiment of the present invention, both the sensing electrode unit and the scan electrode unit are made of transparent conductive material.

According to a preferred embodiment of the present invention, the transparent conductive material is ITO.

According to a preferred embodiment of the present invention, one end of the scan electrode lead is connected to a second end of the scan electrode, and the other end of the scan electrode lead is connected to the control unit; wherein both sides of the sensing electrode are further disposed with filling metal.

According to a preferred embodiment of the present invention, the filling metal is a transparent conductive material, and the transparent conductive material is ITO.

Another object of the present invention is to provide a capacitive touch screen, which comprises a pixel array substrate, a touch screen substrate disposed oppositely to the pixel array substrate, and a liquid crystal layer disposed between the pixel array substrate and the touch screen substrate; wherein the touch screen substrate further comprising a touch structure layer, and the touch structure layer comprising a plurality of the aforementioned capacitive touch units.

Compared to the known techniques, the present invention provides the following advantages:

(1) the present invention divides the sensing electrode and the scan electrode into a plurality of identical sensing electrode units and scan electrode units, and the sensing electrode units and scan electrode units are coplanar and have the same arrangement direction, so as to achieve the object of reducing the visual perceptibility to human eye and solve the visual difference between the sensing electrode and scan electrode array; and (2) the scan electrode of the present invention is embedded in the sensing electrode so that the scan electrode is surrounded by the sensing electrode, which increases the capacitance of the mutual capacitance between the two electrodes and increases the signal-noise-ratio (SNR) of the touch signal.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

As aforementioned, the present invention is to provide a capacitive touch unit able to reduce the visual difference perceptible to the human eye, and a capacitive touch screen comprising the capacitive touch unit. The capacitive touch unit comprises: a sensing electrode, connected to a control unit through a sensing electrode lead; and a plurality of scan electrodes, disposed at two sides of the sensing electrode; the scan electrode being connected to the control unit through a scan electrode lead, and the scan electrodes and the sensing electrode being coplanar; wherein the sensing electrode comprising a plurality of identical sensing electrode units, the plurality of sensing electrode units being arranged regularly along a same direction, the plurality of sensing electrode units being electrically connected; each scan electrode comprising a plurality of identical scan electrode units, the plurality of scan electrode units being arranged regularly along a same direction and the direction being the same as the sensing electrode units, and the plurality of scan electrode units being electrically connected.

In the aforementioned capacitive touch unit, the sensing electrode and the scan electrode are divided into a plurality of sensing electrode units and scan electrode units of the same shape, and the sensing electrode units and scan electrode units are coplanar and have the same arrangement direction, so as to achieve the object of reducing the visual perceptibility to human eye and solve the visual difference between the sensing electrode and scan electrode array.

The following describes the invention in details with drawings and embodiments.

Figure 1:
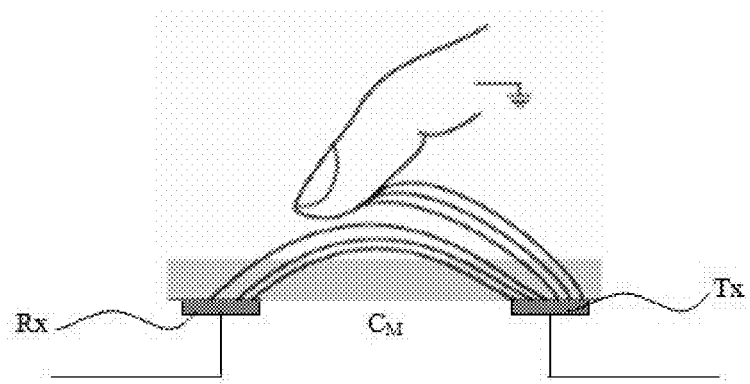
FIG. 1 is a schematic view showing the theory behind the known mutual capacitive touch screen.
Figure 2:
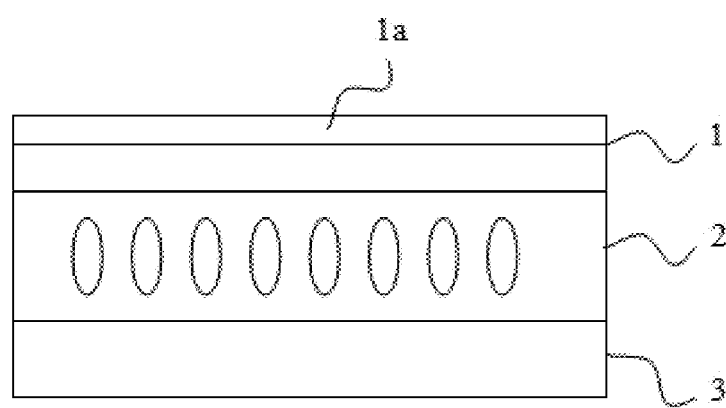
FIG. 2 is a schematic view showing the structure of a capacitive touch screen provided by an embodiment of the present invention.
Figure 3:
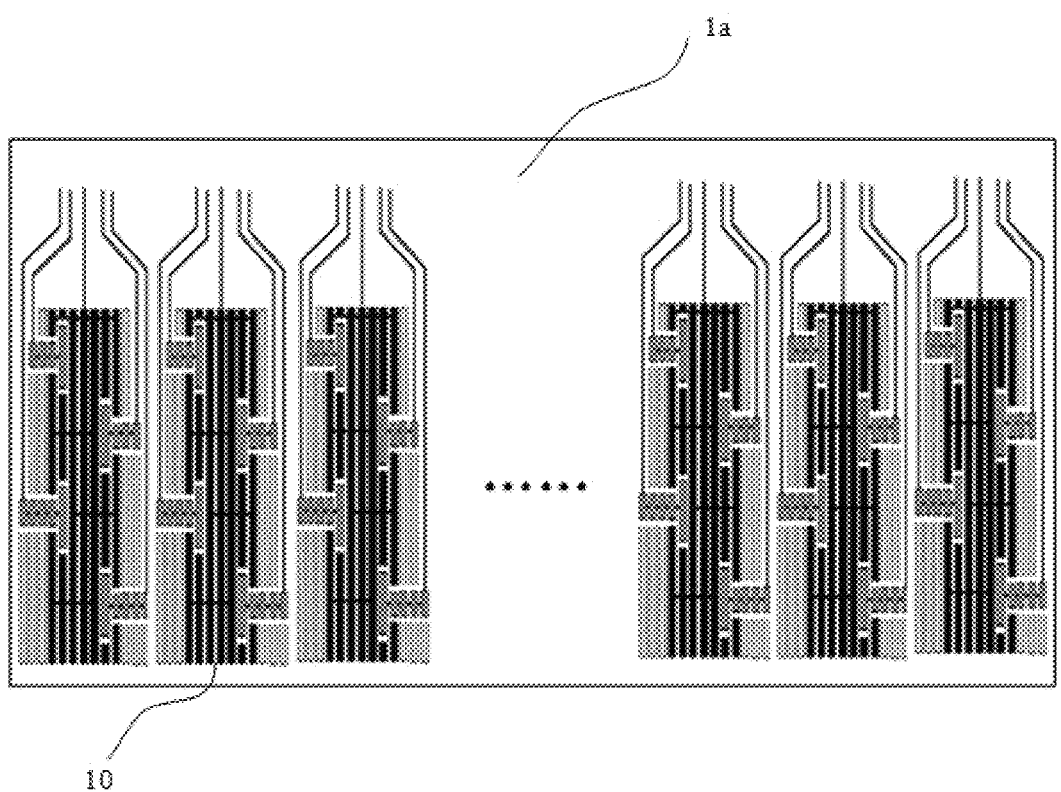
FIG. 3 is a schematic view showing the structure of the touch structure layer of the capacitive touch screen of FIG. 2.

As shown in FIG. 2, the capacitive touch screen of the present embodiment comprises a pixel array substrate 3, a touch screen substrate 1 disposed oppositely to the pixel array substrate 3, and a liquid crystal layer 2 disposed between the pixel array substrate 3 and the touch screen substrate 1; wherein the touch screen substrate further comprising a touch structure layer 1a, and the touch structure layer 1a comprising a plurality of the aforementioned capacitive touch units 10 (as shown in FIG. 3).

Figure 4:
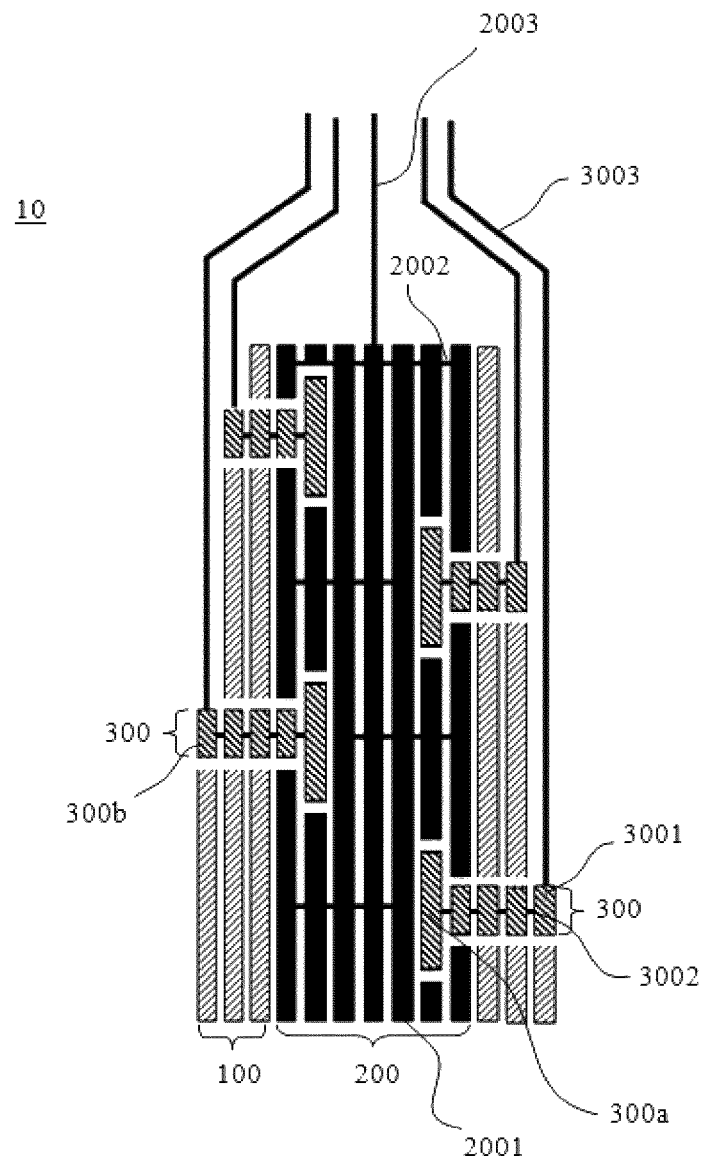
FIG. 4 is a schematic view showing the structure of the capacitive touch unit provided by an embodiment of the present invention.

In the instant embodiment, the capacitive touch unit 10 comprises the following structure, as shown in FIG. 4: a sensing electrode 200, connected to a control unit (not shown) through a sensing electrode lead 2003; and a plurality of scan electrodes 300, disposed at two sides of the sensing electrode 200. The instant embodiment uses an exemplar with two scan electrodes 300 disposed on each side. The scan electrodes 300 are connected to the control unit through a scan electrode lead 3003, and the scan electrodes 300 and the sensing electrode 200 are coplanar.

In the instant embodiment, the sensing electrode 200 comprises a plurality of identical sensing electrode units 2001, the plurality of sensing electrode units 2001 is arranged regularly along a same direction, and the plurality of sensing electrode units 2001 is electrically connected. Each scan electrode 300 comprises a plurality of identical scan electrode units 3001, the plurality of scan electrode units 3001 is arranged regularly along a same direction and the direction is the same as the sensing electrode units 2001, and the plurality of scan electrode units 3001 is electrically connected through a second lead 3002.

In the instant embodiment, both the sensing electrode units 2001 and the scan electrode unit 3001 are made of transparent conductive material. The transparent conductive material is ITO.

In the instant embodiment, both the sensing electrode unit 2001 and the scan electrode unit 3001 are of long strip structure having a straight line shape. In other embodiments, both the sensing electrode unit 2001 and the scan electrode unit 3001 may be of long strip structure having other shapes, such as, wave or grid.

In the instant embodiment, a gap between two neighboring sensing electrode units 2001 is less than 129 um, a gap between two neighboring scan electrode units 3001 is less than 129 um, and a gap between the neighboring sensing electrode unit 2001 and the scan electrode unit 3001 is less than 129 um.

Figure 5:
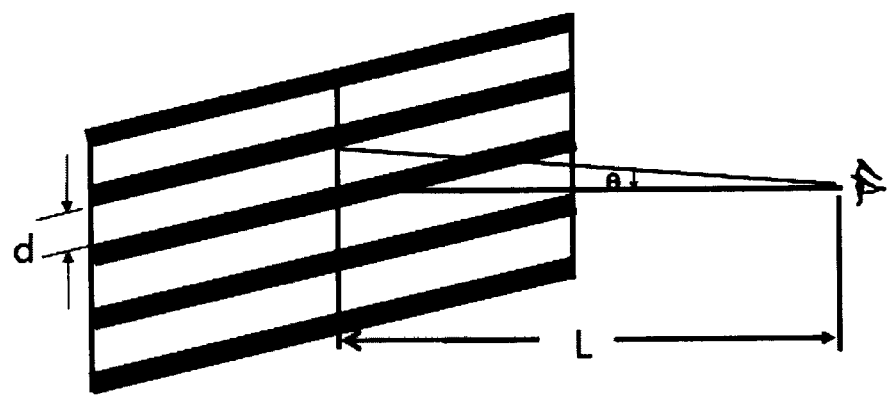
FIG. 5 is a schematic view showing the relation between the distance d between electrode units and the distance L between the human eye and the touch interface.

Regarding the choice on the distance between the electrode units, it is necessary to take the human eye resolution limit and the viewing distance into account. The displaying technique considers that the human eye resolution limit has an angle of 1', but the known retina available in the market shows that the human eye resolution limit has an angle of 0.59', which means that the display needs to provide higher resolution. As shown in FIG. 5, L is the distance between the human eye and the touch interface, θ is the human eye resolution limit angle, d is the distance of neighboring electrode units, wherein the d≈L×θ. In the instant embodiment, the distance between human eye and the touch interface is 75 cm (based on the average arm length of a grown up), θ=0.59'=0.000172 arc, then:

$$d \approx L \times \theta = 75 \text{ cm} \times 10000 \times 0.000172 = 129 \text{ μm}$$

It should be noted that the choice of d=129 um is only for illustrative. In other embodiments, the distance between human eye and the touch interface can be estimated based on the application object of the touch screen so as to select a different distance d between electrode units.

As in the aforementioned capacitive touch unit, the sensing electrode 200 and the scan electrode 300 are respectively divided into a plurality of sensing electrode units 2001 and scan electrode units 3001, which are of long strip structure having a straight line shape. The sensing electrode units 2001 and the scan electrode units 3001 are coplanar and have the same arrangement direction. Also, through controlling the distance d between electrode units, the object to reduce the perceptible difference to human eye and solve the visual difference between the sensing electrode and scan electrode array is achieved.

In the instant embodiment, a first end 300a of the scan electrode 300 is embedded in the sensing electrode 200. A gap exists between the scan electrode 300 and the sensing electrode 200. Furthermore, the tip of the first end 300a of the scan electrode 300 extends laterally along both sides. Through embedding the scan electrode 300 in the sensing electrode 200 so that the scan electrode 300 is surrounded by the sensing electrode 200, and further extending the tip of the first end 300a of the scan electrode 300 laterally along both sides, the area between the electrode scan electrode 300 and the sensing electrode 200 is increased, which increase the mutual capacitance between the two electrodes, reduces the noise effect and increases the signal-noise-ratio (SNR) of the touch signal.

In the instant embodiment, one end of the scan electrode lead 3003 is connected to a second end 300b of the scan electrode 300, and the other end of the scan electrode lead is connected to the control unit; wherein both sides of the sensing electrode 200 are further disposed with filling metal 100, for filling up the gap area between the sensing electrode 200 and the scan electrode lead 3003 as well as acting as shielding protective layer for the sensing electrode 200. The filling metal 100 comprises a plurality of filling metal units of long strip structure having a straight line shape. The distances between two neighboring filling metal units, between neighboring sensing electrode unit 2001 and the filling metal units, and between the neighboring scan electrode unit 3001 and the filling metal units are all less than 129 um. The filling metal 100 is a transparent conductive material, and the transparent conductive material is ITO. Through disposing filling metal 100 on the gap area between the sensing electrode 200 and the scan electrode lead 3003, the interference by the signal in the scan electrode lead 3003 on the sensing electrode 200 is shielded, which further increases the SNR of the touch signal.

In summary, the present invention divides the sensing electrode and the scan electrode into a plurality of identical sensing electrode units and scan electrode units, and the sensing electrode units and scan electrode units are coplanar and have the same arrangement direction, so as to achieve the object of reducing the visual perceptibility to human eye and solve the visual difference between the sensing electrode and scan electrode array. Also, the scan electrode of the present invention is embedded in the sensing electrode so that the scan electrode is surrounded by the sensing electrode, which increases the capacitance of the mutual capacitance between the two electrodes and increases the signal-noise-ratio (SNR) of the touch signal.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A capacitive touch unit, which comprises:
   a sensing electrode, connected to a control unit through a sensing electrode lead; and a plurality of scan electrodes, disposed at two sides of the sensing electrode; each of the scan electrodes being connected to the control unit through a scan electrode lead, and the scan electrodes and the sensing electrode being coplanar;
   wherein the sensing electrode comprises a plurality of identical sensing electrode units, the plurality of sensing electrode units is arranged regularly along a same direction, the plurality of sensing electrode units is electrically connected; each scan electrode comprises a plurality of identical scan electrode units, the plurality of scan electrode units is arranged regularly along a same direction and the direction is the same as the sensing electrode units, and the plurality of scan electrode units is electrically connected.

2. The capacitive touch unit as claimed in claim 1, wherein a gap between two neighboring sensing electrode units is less than 129 um, a gap between two neighboring scan electrode units is less than 129 um, and a gap between the neighboring sensing electrode unit and the scan electrode unit is less than 129 um.

3. The capacitive touch unit as claimed in claim 1, wherein both the sensing electrode unit and the scan electrode unit are of long strip structure having a shape of straight line.

4. The capacitive touch unit as claimed in claim 1, wherein a first end of the scan electrode is embedded in the sensing electrode, and a gap exists between the scan electrode and the sensing electrode.

5. The capacitive touch unit as claimed in claim 4, wherein a tip of the first end of the scan electrode extends laterally along both sides.

6. The capacitive touch unit as claimed in claim 1, wherein both the sensing electrode unit and the scan electrode unit are made of transparent conductive material.

7. The capacitive touch unit as claimed in claim 6, wherein the transparent conductive material is ITO.

8. The capacitive touch unit as claimed in claim 1, wherein one end of the scan electrode lead is connected to a second end of the scan electrode, and the other end of the scan electrode lead is connected to the control unit; wherein both sides of the sensing electrode are further disposed with filling metal.

9. The capacitive touch unit as claimed in claim 8, wherein the filling metal is a transparent conductive material, and the transparent conductive material is ITO.

10. The capacitive touch unit as claimed in claim 4, wherein one end of the scan electrode lead is connected to a second end of the scan electrode, and the other end of the scan electrode lead is connected to the control unit; wherein both sides of the sensing electrode are further disposed with filling metal.

11. The capacitive touch unit as claimed in claim 10, wherein the filling metal is a transparent conductive material, and the transparent conductive material is ITO.

12. A capacitive touch screen, which comprises: a pixel array substrate, a touch screen substrate disposed oppositely to the pixel array substrate, and a liquid crystal layer disposed between the pixel array substrate and the touch screen substrate; wherein the touch screen substrate further comprising a touch structure layer, and the touch structure layer comprising a plurality of capacitive touch units; the capacitive touch unit further comprising:
a sensing electrode, connected to a control unit through a sensing electrode lead; and a plurality of scan electrodes, disposed at two sides of the sensing electrode; each of the scan electrodes being connected to the control unit through a scan electrode lead, and the scan electrodes and the sensing electrode being coplanar;
wherein the sensing electrode comprises a plurality of identical sensing electrode units, the plurality of sensing electrode units is arranged regularly along a same direction, the plurality of sensing electrode units is electrically connected; each scan electrode comprises a plurality of identical scan electrode units, the plurality of scan electrode units is arranged regularly along a same direction and the direction is the same as the sensing electrode units, and the plurality of scan electrode units is electrically connected.

13. The capacitive touch screen as claimed in claim 12, wherein a gap between two neighboring sensing electrode units is less than 129 um, a gap between two neighboring scan electrode units is less than 129 um, and a gap between the neighboring sensing electrode unit and the scan electrode unit is less than 129 um.

14. The capacitive touch screen as claimed in claim 12, wherein both the sensing electrode unit and the scan electrode unit are of long strip structure having a shape of straight line.

15. The capacitive touch screen as claimed in claim 12, wherein a first end of the scan electrode is embedded in the sensing electrode, and a gap exists between the scan electrode and the sensing electrode.

16. The capacitive touch screen as claimed in claim 15, wherein a tip of the first end of the scan electrode extends laterally along both sides.

17. The capacitive touch screen as claimed in claim 12, wherein both the sensing electrode unit and the scan electrode unit are made of transparent conductive material; and the transparent conductive material is ITO.

18. The capacitive touch screen as claimed in claim 12, wherein one end of the scan electrode lead is connected to a second end of the scan electrode, and the other end of the scan electrode lead is connected to the control unit; wherein both sides of the sensing electrode are further disposed with filling metal, the filling metal is a transparent conductive material, and the transparent conductive material is ITO.

19. The capacitive touch screen as claimed in claim 15, wherein one end of the scan electrode lead is connected to a second end of the scan electrode, and the other end of the scan electrode lead is connected to the control unit; wherein both sides of the sensing electrode are further disposed with filling metal, the filling metal is a transparent conductive material, and the transparent conductive material is ITO.

* * * * *